(12) United States Patent  
Allen et al.

(10) Patent No.: US 7,082,896 B2  
(45) Date of Patent: Aug. 1, 2006

(54) MOUNTING SYSTEM ALLOWING FOR THERMAL EXPANSION OF AN ENGINE OF A GENERATOR SET

(75) Inventors: Jacob S. Allen, Kohler, WI (US); Richard D. Locke, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 121 days.

(21) Appl. No.: 10/814,762

(22) Filed: Mar. 31, 2004

(65) Prior Publication Data

US 2005/0218288 A1  Oct. 6, 2005

(51) Int. Cl.  
*F02B 43/00* (2006.01)
(52) U.S. Cl. .......................................... 123/2; 290/1 A
(58) Field of Classification Search ..................... 123/2; 290/1 A See application file for complete search history.

(56) References Cited

U.S. PATENT DOCUMENTS

| | | | |
|---|---|---|---|
| 3,245,646 A | 4/1966 | Baratoff |
| 4,995,598 A | 2/1991 | Ingham |
| 5,676,356 A | 10/1997 | Ekonen et al. |
| 6,354,558 B1 | 3/2002 | Li |
| 6,416,030 B1 | 7/2002 | Bergdahl et al. |

*Primary Examiner*—Noah P. Kamen  
(74) *Attorney, Agent, or Firm*—Quarles & Brady LLP

(57) ABSTRACT

A generator set assembly in which an engine is mounted upon a base by way of a specialized mounting component, and a related method of mounting an engine upon a base using such a specialized mounting component, are disclosed. The specialized mounting component includes a first rigid portion capable of being fixedly coupled to the engine, a second rigid portion capable of being fixedly coupled to the base, a flexible intermediate portion coupled between the first and second rigid portions that allows relative movement of the first and second rigid portions to occur in response to expansion and contraction of the engine during operation of the engine, and a further component extending between the first and second rigid portions through the flexible intermediate portion. The further component is capable of limiting relative movement of the first and second rigid portions.

18 Claims, 5 Drawing Sheets

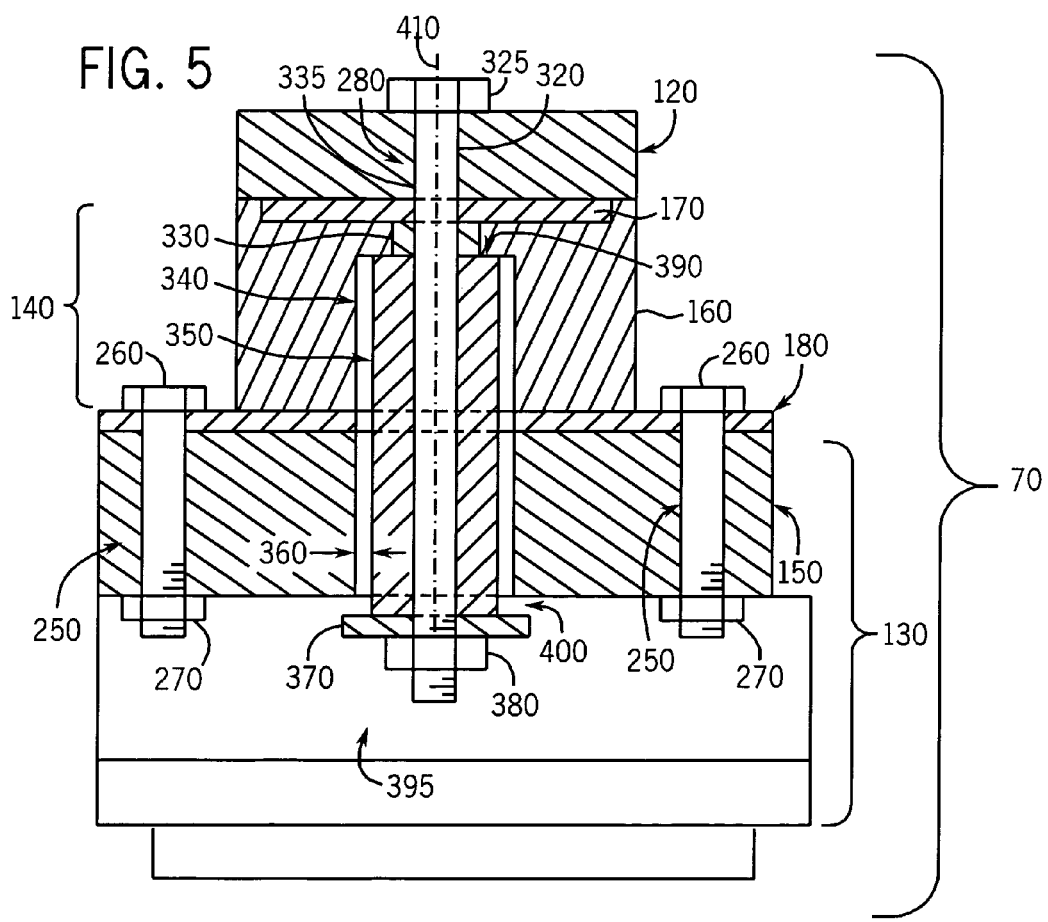

MOUNTING SYSTEM ALLOWING FOR THERMAL EXPANSION OF AN ENGINE OF A GENERATOR SET

FIELD OF THE INVENTION

The present invention relates to engine mounting systems and, more particularly, relates to mounting systems for engines employed in generator sets.

BACKGROUND OF THE INVENTION

Generator sets (or simply "gensets") commonly experience significant amounts of vibration due to the operation of engines within the gensets that rotate the alternators of the gensets. Consequently, it is usually necessary and desirable to isolate the gensets from the foundation on which they are supported, to avoid the transmission of undesirable vibrations to the foundation and other components outside of the gensets. Commonly the engine of the genset is mounted by way of an additional set of mounting component(s) that is similar to that used to mount the alternator of the genset.

Conventionally, two types of mounting systems are available for isolating vibrations of an engine of a genset from a foundation (or other support structure) of the genset. According to a first conventional mounting system, the engine is mounted by way of one or more rubberized components to one or more skid rails, which in turn are rigidly mounted upon the foundation. According to a second conventional mounting system, the engine is rigidly mounted to one or more skid rails, and the skid rails in turn are coupled to the foundation by way of springs such that the skid rails are spring isolated from the foundation. Both of these conventional mounting systems largely if not entirely succeed in vibrationally isolating the engine from its foundation, and/or in dampening vibrations of the engine.

Independent of the vibrations produced by an engine, the engine also experiences changes in temperature during operation. These temperature changes produce changes in the dimensions of the engine. The amount of such dimensional variation that occurs typically is a function of the overall size of the engine.

Such dimensional changes in an engine due to temperature variation can be problematic with respect to the attachment of the engine to its foundation by way of the mounting systems. In particular, if the front and rear of the engine are rigidly fixed to the skid rails and/or the foundation, and the expansion of the engine is significant, excessive stresses can develop within the engine block and the mounting components (and even with respect to the skid rails and/or the foundation).

To prevent such excessive stresses from developing, some conventional genset assemblies employ additional mounting components that allow the engine to expand, typically both longitudinally (e.g., along an axis parallel to the crankshaft of the engine) and transversely (e.g., along an axis perpendicular to the crankshaft). Such additional components can include, in particular, a "hat" channel in the skid rail or foundation to which the engine is mounted, which receives one or more of the mounting components supporting the engine and allows for at least some movement of those mounting components relative to the skid rail/foundation.

Although the use of such a hat channel successfully allows some of the stresses arising due to engine expansion/contraction to be alleviated, it does not entirely alleviate the problems associated with these stresses. In particular, if the engine is sufficiently large, the engine expansion/contraction can become so great that it is nearly impossible to maintain the structural integrity of the connection between the hat channel and the mounting component(s) coupled within the hat channel, such that the mounting connection of the engine to the skid rail/foundation can become weakened or broken.

Therefore it would be advantageous if a new mounting system could be developed for mounting the engine of a genset (or even the entire genset) with respect to a foundation (or other support structure) so that the engine was both largely (or entirely) vibrationally isolated from the foundation and also was coupled to the foundation in a manner that allowed for expansion/contraction of the engine without the creation of excessive stresses upon the engine, the mounting components, or the foundation. Further it would be advantageous if the mounting system was configured to avoid excessive movement that could result in the damaging of mounting system components, and also maintained coupling between the engine and the foundation even when stresses did for some reason become excessive.

SUMMARY OF THE INVENTION

The present inventors have recognized that an engine of a generator set could be mounted upon a base in an improved manner in which, while one end of the engine was mounted in a conventional manner to the base, another end of the engine was mounted using one or more specialized mounting components that allowed for relative movement between that other end of the engine and the base without the creation of excessive stress and, at the same time, limited relative movement to within a range so that the mounting components themselves were not forced to accommodate excessive amounts of movement. These goals were achieved through the use of specialized mounting components each having a flexible, rubberized portion sandwiched in between two rigid portions capable of being respectively coupled to the engine and the base. Additionally, each of the specialized mounting components includes a shaft that extends from one of the rigid portions through the intermediate portion and the other of the rigid portions and out beyond that other rigid portion.

By making the shaft narrower in diameter than a channel through which it extends in the intermediate portion and the other rigid portion, relative shearing motion of the first and second rigid portions is tolerated within a limited range. By making the shaft extend beyond the other rigid portion and placing a cap on the shaft having a diameter greater than that of the channel and at a location beyond a normal position of the other rigid portion, relative vertical motion of the first and second rigid portions apart from one another also is tolerated within a limited range. Further, because of the cap, movement of the first and second rigid portions is restricted to within this range even if the forces applied to the rigid portions become excessive such that the intermediate portion would otherwise be unable to resist further movement of the rigid portions apart from one another beyond that range.

In particular, the present invention relates to a generator set assembly having an alternator, an engine coupled to the alternator and capable of transmitting rotational energy to the alternator, a base, and a plurality of engine mounting components positioned between the base and the engine. At least a first of the engine mounting components includes a first rigid portion capable of being fixedly coupled to the engine, a second rigid portion capable of being fixedly coupled to the base component, a flexible intermediate portion coupled between the first and second rigid portions that allows relative movement of the first and second rigid portions to occur in response to expansion and contraction of the engine during operation of the engine, and a further component extending between the first and second rigid portions through the flexible intermediate portion. The further component is capable of limiting relative movement of the first and second rigid portions.

Further, the present invention relates to a mounting component for mounting an engine onto a base. The mounting component includes a first rigid portion capable of being fixedly coupled to the engine, a second rigid portion capable of being fixedly coupled to the base, and an intermediate portion coupled between the first and second rigid portions, where the intermediate portion is formed at least in part from a flexible material so that the intermediate portion is capable of allowing relative movement of the first and second rigid portions. Further, the mounting component includes an additional component coupled to one of the first and second rigid portions and extending through the intermediate portion and through at least a portion of the other of the first and second rigid portions and beyond a surface of the other rigid portion, where the additional component is capable of interacting with at least one of the intermediate portion and the other rigid portion so that at least one of relative shearing movement between the first and second rigid portions and relative movement of the first and second rigid portions apart from one another is limited.

A method of mounting an engine of a generator set to a base so that the engine can expand and contract during operation as a temperature of the engine changes without producing excessive stresses upon mounting components supporting the engine with respect to the base. The method includes providing a mounting component having first and second rigid components attached on opposite sides of a flexible intermediate component, and further having an additional component extending from one of the first and second rigid components through a channel within the intermediate component and at least a portion of the other of the first and second rigid components, the additional component extending beyond a surface of the other rigid component and having a shaft that extends through the channel and has an outer diameter that is less than an inner diameter of the channel. The method additionally includes fixedly coupling the second rigid component to the base, and fixedly coupling the first rigid component to the engine.

BRIEF DESCRIPTION OF THE DRAWINGS

FIGS. 4 and 5 show partial, cross-sectional view taken along lines 4—4 and 5—5 of FIG. 3.

DETAILED DESCRIPTION OF THE PREFERRED EMBODIMENT

Figure 1:
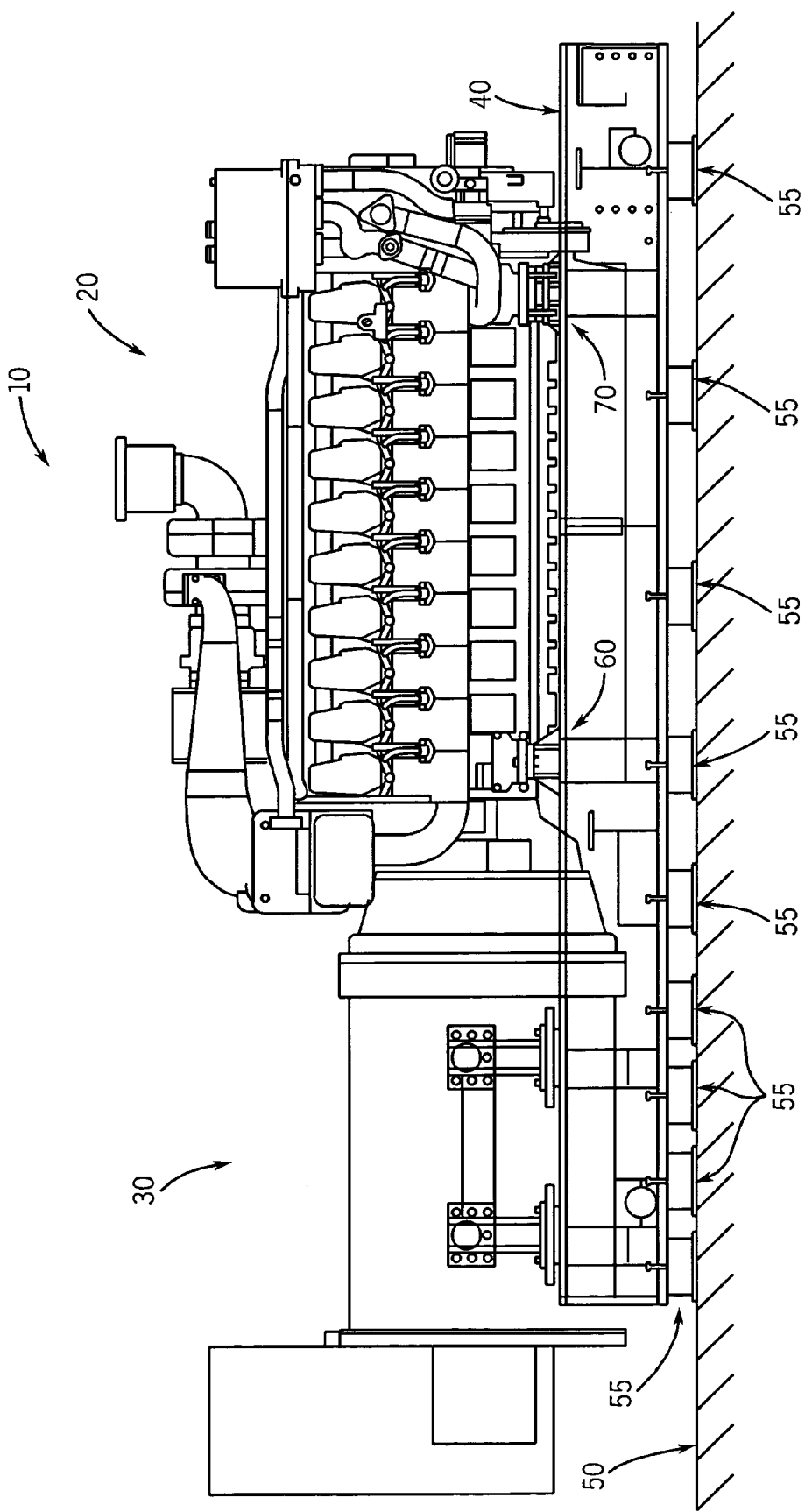
FIG. 1 shows an elevation view of an exemplary generator set having an alternator and an engine mounted on skid rails, and a foundation.

Referring to FIG. 1, an exemplary generator set (or simply "genset") 10 is shown to include an engine 20 and an alternator 30. The engine 20 is typically an internal combustion engine, although it also could be another type of engine as well. The alternator 30 can be any of a variety of types of alternators, such as three-phase alternators. The engine 20 drives the alternator 30 (providing rotational energy thereto) by way of a crankshaft (not shown). Each of the engine 20 and the alternator 30 is mounted on two skid rails 40 (one of which is shown, the two rails being parallel to one another), which in turn are mounted on a foundation 50 by way of spring isolators 55.

The engine 20 in particular is mounted onto the skid rails 40 by way of a pair of rear mounting components 60 and a pair of forward mounting components 70, where one mounting component of each pair is coupled to each of the skid rails 40. In the present embodiment in which the skid rails 40 are mounted to the foundation 50 by way of the spring isolators 55, the rear mounting components 60 are of a conventional, rigid mounting pad type. That is, the mounting feet (not shown) at the rear of the engine 20 are rigidly coupled to the skid rails 40, e.g., by way of one or more bolts. In alternate embodiments such as, for example, embodiments in which the skid rails 40 are rigidly coupled to the foundation 50 (without any spring isolators 55), the rear mounting components can employ rubber mount pads and/or springs by which the mounting feet (not shown) at the rear of the engine 20 are coupled to the skid rails 40. By virtue of such non-rigid components, the skid rails 40 would be isolated from most or all vibrations created by the engine 20 during its operation that might otherwise be transmitted via the rear mounting components. Depending upon the embodiment, the rear mounting components 60 can also serve to dampen engine vibrations in addition to (or instead of) serving to partially or entirely vibrationally isolate the engine 20 from the skid rails 40.

The skid rails 40 themselves can be mounted rigidly (e.g., by way of one or more bolts) to the foundation 50. However, in alternate embodiments, the skid rails 40 also can be mounted to the foundation 50 by way of one or more of the above-discussed vibration-isolating/dampening components including, for example, rubberized or spring-based mounting components. In some such embodiments where vibration-isolating/dampening components are employed in between the skid rails 40 and the foundation 50, the rear mounting feet can be coupled directly and rigidly (e.g., by way of one or more bolts) to the skid rails. In all of these cases, nevertheless, the foundation is largely if not entirely vibrationally-isolated from the engine 20 (and/or the engine's vibrations are largely if not entirely damped so as not to significantly affect the foundation).

Figure 2:
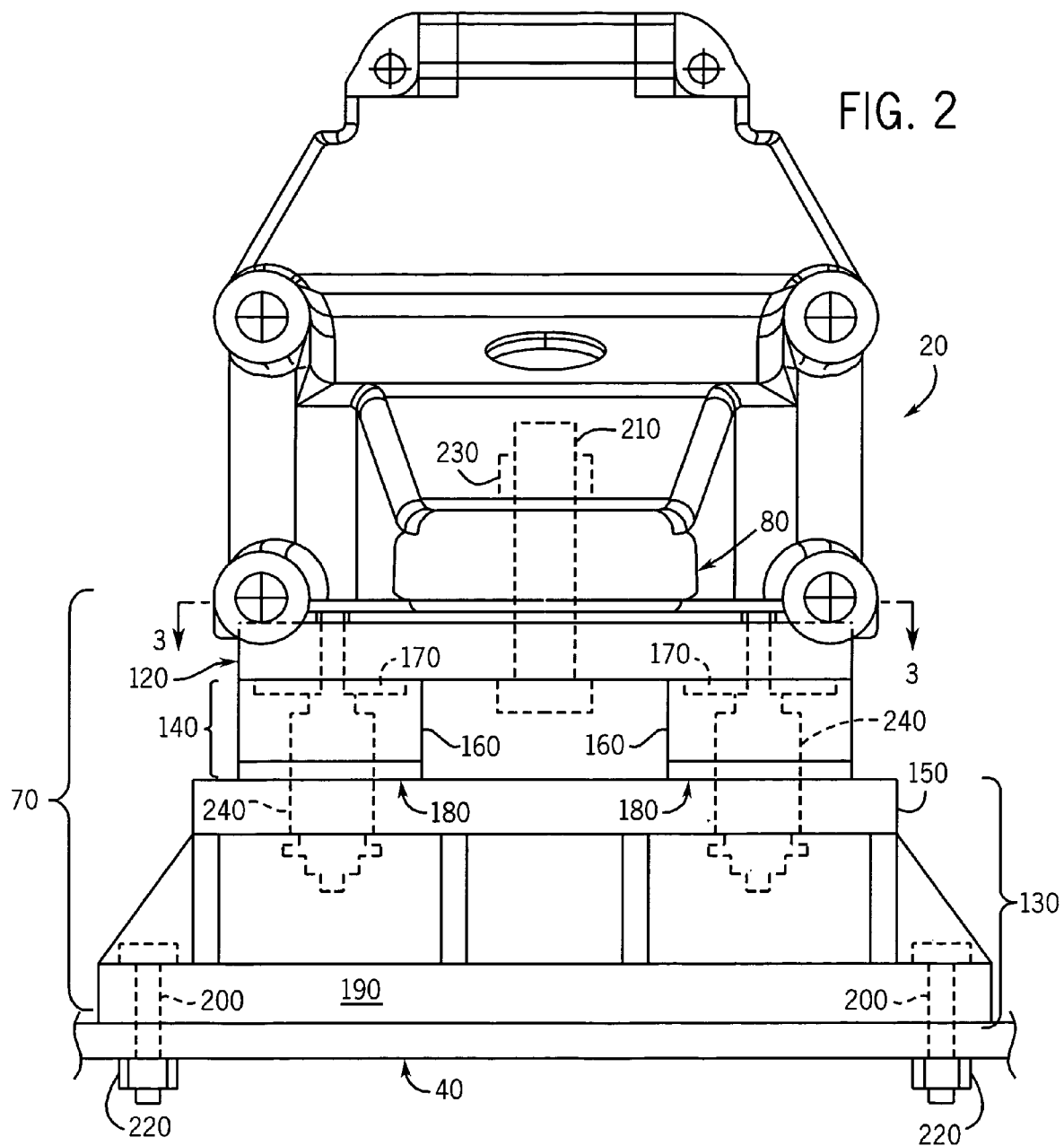
FIG. 2 shows an elevation view of a front mounting component for the engine of FIG. 1.
Figure 3:
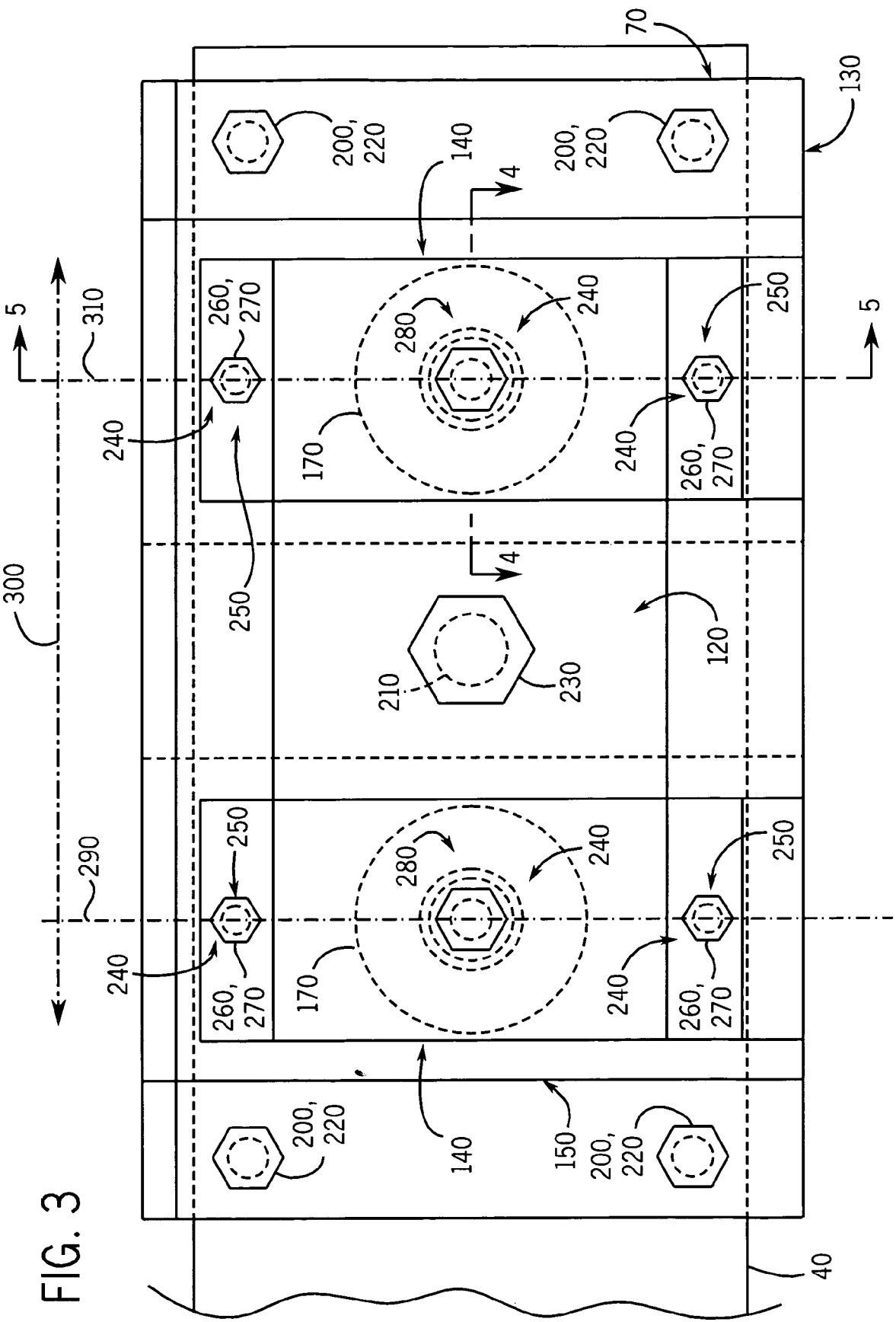
FIG. 3 shows a cross-sectional view taken along line 3—3 of FIG. 2.
Figure 4:
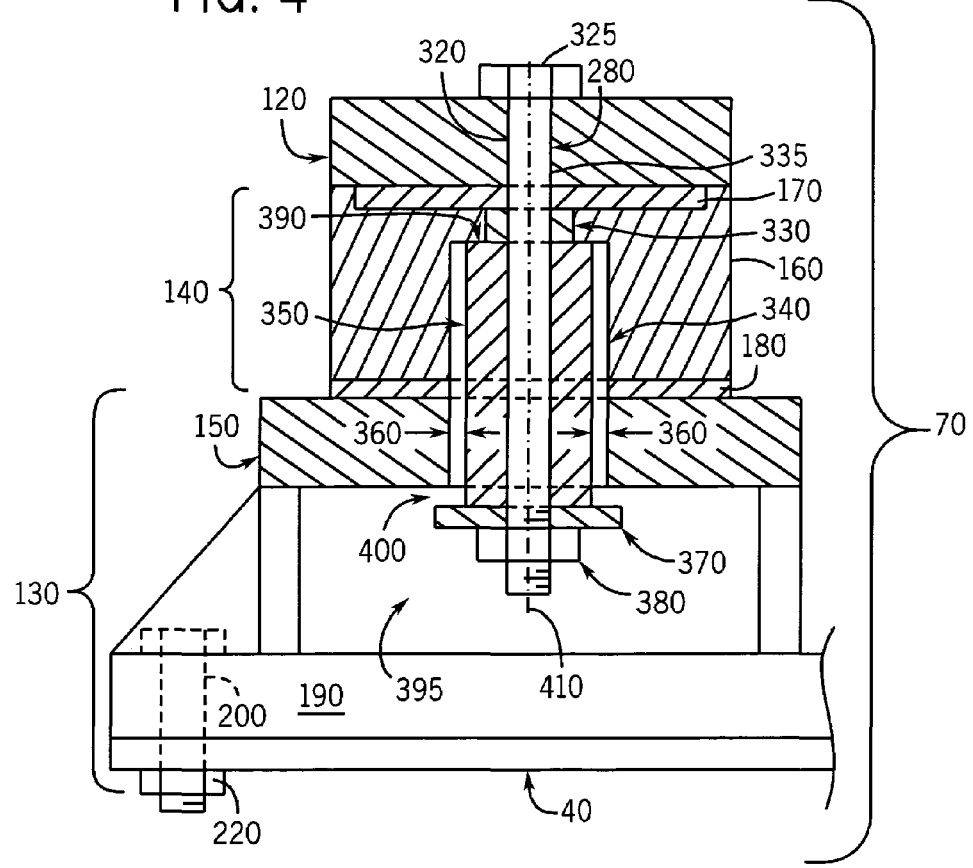

Referring to FIGS. 2–4, in accordance with one embodiment of the present invention, the front mounting components 70 (in contrast to the rear mounting components 60) are of a specialized design that allows for movement of the engine 20 in relation to the skid rails 40 and thereby allows for expansion/contraction of the engine to occur as it heats up and cools down during operation, without the creation of excessive strains or stresses upon the engine 20, the skid rails 40 or the mounting components themselves. Further, the front mounting components 70 are designed so that the amount of relative movement accommodated by the front mounting components is limited so that excessive stress-induced motion is not experienced by the front mounting components and also so that, in the event that excessive stresses are imposed upon the front mounting components, those components nevertheless retain the engine with respect to the skid rails.

Generally, as shown in FIG. 2, each of the front mounting components 70 is coupled between a respective mounting foot 80 of the engine 20 and one of the skid rails 40. Each of the front mounting components 70 includes a first top plate 120, a support structure 130, and an intermediate portion 140 sandwiched in between the first top plate and a second top plate 150 of the support structure. A base 190 of the support structure 130 is coupled directly to one of the skid rails 40 by way of four bolts 200 and corresponding nuts 220, and the first top plate 120 is coupled directly to the engine 20 by way of a bolt 210 and a corresponding nut 230. The first top plate 120 and the support structure 130 can be made of steel, another metal, or a variety of other types of relatively rigid, strong materials (e.g., certain plastics).

The intermediate portion 140 includes two flexible (e.g., rubberized or elastomeric) portions 160 sandwiched in between respective pairs of first and second metal plates 170 and 180, respectively, where each of the metal plates is affixed to its respective flexible portion (e.g., by way of a cement or other bonding material). More specifically, each of the first metal plates 170 is sandwiched between a respective one of the flexible portions 160 and the first top plate 120, while each of the second metal plates 180 is sandwiched between a respective one of the flexible portions and the second top plate 150. Depending upon the embodiment, the metal plates 170,180 also respectively can be affixed (e.g., by way of a cement or welding) to the respective one of the top plates 120,150 with which the respective plates are in contact. Although the plates 170, 180 are termed metal plates in the present embodiment, in alternate embodiments the plates can be made of any of a variety of other rigid or semi-rigid materials, e.g., other metals or plastics.

Also as shown in FIG. 2, in the present embodiment, the second metal plates 180 below each of the flexible portions 160 are coextensive in their width and length with their respective flexible portions, such that the flexible portions are not in direct contact with the second top plate 150. However, in contrast, the first metal plates 170 extend only partly across their respective flexible portions 160, such that much of the flexible portions' upper surfaces are in direct contact with the first top plate 120. In alternate embodiments, the first metal plate 170 associated with each of the flexible portions 160 can be larger than shown (or even coextensive with its flexible portion), and/or the second metal plate 180 associated with each of the flexible portions can be less than coextensive with its flexible portion.

Referring additionally to FIG. 3, the flexible portions 160, the first and second metal plates 170,180 and the first and second top plates 120,150 are coupled together by way of a plurality of coupling components 240, which are shown in phantom in FIG. 2 and shown in more detail in FIG. 3. In particular, as shown in FIG. 3, the coupling components 240 associated with each of the respective front mounting components 70 include two primary coupling components 250 and a secondary coupling component 280.

Because in the present embodiment each of the primary and secondary coupling components 250,280 associated with each of the front mounting components 70 are aligned with one another (as shown in FIG. 3), FIG. 2 generally shows in phantom an outline corresponding to a superimposition of cross-sections of the various coupling components. Lines 290,310 along which the primary and secondary coupling components 250,280 associated with the respective front mounting components 70 are generally aligned are in the present embodiment perpendicular to a line 300, which is parallel to a longitudinal axis of the engine 20 (e.g., parallel to a crankshaft axis of the engine).

Each of the two primary coupling components 250 associated with each of the respective front mounting components 70 respectively couples the respective second metal plate 180 to the second top plate 150 in a fixed manner. That is, the coupling components 250 are intended to restrain movement of the second metal plates 180 apart from the second top plate 150. In the embodiment shown, each of these two side coupling components 250 includes a respective bolt 260 and a respective nut 270, although in alternate embodiments other types of coupling components known in the art could be employed.

As shown in more detail in FIGS. 4 and 5, the secondary coupling component 280 includes a bolt 320 having a head 325 that interfaces a top of the first top plate 170 and a shaft 335 extending downward from the head (the head restricting downward movement of the bolt beyond the first top plate). The shaft 335 extends through the entire intermediate portion 140 and further through each of the first and second top plates 120,150 and out beyond those top plates. The first metal plate 170, and consequently the entire intermediate portion 140, are held tight against the first top plate 120 by way of a threaded nut 330 that is threaded onto the shaft 335 and positioned directly under the first metal plate. Adjacent the nut 330, on the side of the nut opposite the first metal plate 170, is an oversized hole or channel 340 extending through the remainder of the intermediate portion 140 (including most of the flexible portion 160 and the second metal plate 180) and through the second top plate 150.

Further as shown, a spacer 350 is positioned within the channel 340 along the shaft 335. The spacer 350, which in the present embodiment is made from steel (but in alternate embodiments can be made from another material), is sufficiently narrow in its outer diameter that it does not occupy all of the space within the channel 340. Consequently, an annular float space 360 exists between the spacer 350 and the intermediate portion 140/second top plate 150. Because of the existence of the float space 360, the first and second top plates 120,150 can generally move sideways relative to one another along the line 300 as well as along (parallel to) the lines 290/310 (see FIG. 3), as allowed by the flexible portion and limited by the size of the float space. In the present embodiment, the annular float space 360 has a width (as measured radially) of about 3 mm, although this width can vary depending upon the embodiment. Because the two primary coupling components 250 only extend through the second metal plates 180 rather than through the flexible portions 160 or the first metal plates 170, the primary coupling components 250 do not restrict this sideways motion of the first and second top plates 120,150 relative to one another (see FIG. 5).

Referring still to FIGS. 4 and 5, the spacer 350 extends between the nut 330 and an oversized washer 370 having an outer diameter greater than the inner diameter of the channel 340. A further nut 380 is positioned on the shaft 335 along the side of the washer 370 opposite the side abutting the spacer 350 to hold the washer 370 onto the shaft and in contact with the spacer. Because a top end of the spacer 350, in addition to abutting the nut 330, also abuts a shoulder 390 of the flexible portion 160, the combination of the nut 380, washer 370 and spacer 350 further contributes to holding the first metal plate 170 tight against the top plate 120.

Further, the shaft 335 and spacer 350 are of sufficient length that they extend beyond (e.g., below) the second top plate 150 into a cavity 395 of the support structure 130, such that an additional space 400 is created between the washer 370 and the second top plate. In the present embodiment, the additional space 400 has a nominal width (e.g., a default width when no downward force is applied to the mounting component 70 tending to compress the first top plate 120 closer to the second top plate 150) of about 3 mm, although in alternate embodiments the additional space can be differently sized.

Because of the additional space 400, while the bolt 320 is axially fixed in relation to the first metal plate 170 and the first top plate 120, it only partly constrains movement of the second top plate 150. That is, the flexible portion 160 can be stretched or compressed allowing the first and second top plates 120,150 to move apart from and toward one another; however, if the flexible portion 160 is sufficiently stretched, the washer 370 comes into contact with the second top plate 150 and prevents further stretching of the flexible portion. Consequently, the first and second top plates 120,150 can move apart from and toward one another along a line 410 shown in FIGS. 4 and 5, as limited (in terms of being moved apart) by the size of the additional space 400.

Through the use of the presently-described front mounting components 70, and particularly the use of the secondary coupling components 280, the present inventive mounting system allows for relative movement of the top plates 120,150 both along the lines 300 and 290/310 (see FIG. 3) and toward and away from one another along the line 410 (see FIGS. 4 and 5). Thus, as the engine 20 expands or contracts during operation tending to cause movement of the mounting foot 80 at the front of the engine in relation to the rear mounting components 60, the first top plate 120 is capable of moving in relation to the second top plate 150 without producing excessive stresses upon any of the engine, the mounting components 60,70, or the skid rails 40/foundation 50.

The front mounting components 70 with the coupling components 280 are designed primarily to allow relative movement of the top plates 120,150 along the lines 300, 290/310 and 410, since expansion and contraction of the engine 20 typically produce forces tending to cause movement along these lines. Further, due to the use of the flexible portions 160, the front mounting components 70 also provide some vibrational isolation/damping between the first and second top plates 120,150.

Additionally, while allowing for relative movement of the top plates 120,150 to alleviate stresses that might otherwise occur during expansion/contraction of the engine 20, the presently-described mounting system also prevents undue stress from being applied upon the intermediate portions 140 that might cause excessive movement of, and even damage to, the front mounting components 70. In particular, by appropriately limiting the sizes of the annular float spaces 360 and the additional spaces 400 of the front mounting components 70, the amounts of shearing and stretching that the flexible portions 160 can undergo are limited. Thus, the flexible portions 160 do not have to bear excessive forces that might lead to their rupture or being otherwise damaged.

Further, the presently-described mounting system provides an additional function in that, in the unlikely event of a rupture of one or both of the flexible portions 160 of the front mounting components 70, the first top plate 120 would still be coupled to the second top plate 150. As shown in FIGS. 4 and 5, the washer 370 has a diameter that is greater than the inner diameter of the channel 340 extending through both the flexible portion 160 and the second top plate 150. Consequently, if the flexible portion 160 were to rupture, the washer 370 would still be precluded from moving past the second top plate 150 and thus the first top plate 120 would still be precluded from moving beyond a certain maximum distance away from the second top plate.

Thus, the present inventive mounting system allows thermal expansion/contraction of an engine to occur in a manner that (under normal operating conditions) avoids the imposition of excessive stresses upon the engine, the mounting components 60,70 or the skid rails 40/foundation 50 (and provides some vibration isolation/damping), and yet avoids being overly tolerant of excessive forces (or movement of the mounting components resulting therefrom) that might damage the front mounting components, and further prevents decoupling of the engine 20 from the skid rails 40 in the unlikely event that the front mounting components do become damaged.

Although FIGS. 1–5 show one embodiment of the present invention, a variety of other embodiments of the present invention are also contemplated. For example, while in the present embodiment, the secondary coupling components 280 are positioned largely in the center of their respective intermediate portions 140, spaced equally between the respective primary coupling components 250, in alternate embodiments, the numbers of the different types of coupling components 250,280 associated with each of the respective front mounting components 70 can vary from that shown, as can the positions of the different coupling components relative to one another and in relation to the respective front mounting component 70. For example, in some alternate embodiments, the primary coupling components 250 coupling the intermediate portion 140 to the second top plate 150 need not be along the side, nor need the secondary coupling component 280 coupling the intermediate portion 140 to the first top plate 120 be at the center of the intermediate portion. In some embodiments, the primary coupling components 250 are not required.

Also, in certain alternate embodiments, the roles of the primary and secondary coupling components could be reversed. That is, the primary coupling component(s) associated with a mounting component could rigidly link the intermediate portion to the first (or upper) top plate rather than the second (or lower) top plate, and the secondary coupling component(s) could hold tight the intermediate portion to the second top plate while only partly constraining the amount of movement of the first top plate (in such an embodiment, the channel 340 would extend within the intermediate portion and the first top plate rather than the second top plate). In alternate embodiments, other parts (e.g., the first and second metal plates 170, 180) are not required.

In further alternate embodiments, the engine is mounted by way of only one, or more than two, specialized front mounting components that allow for expansion/contraction, or the specialized mounting components are utilized to support the engine at other locations other than (or in addition to) the front of the engine.

Also, depending upon the embodiment, the materials utilized to form the various parts of the mounting components can vary from those described above or certain parts can be modified from those shown. For example, instead of using the discrete nut 380, washer 370, spacer 350, nut 330 and bolt 320, different component(s) that performed some or all of the same functions could be employed. For example, a bolt having a threaded shaft and a large (e.g., larger in diameter than the inner diameter of the channel 340) head at one end could be inserted into the second top plate 150 and then into the intermediate portion 140 and finally into the first top plate 120. Such a bolt could be fixed in place by way of a locking nut coupled to its shaft at the end of the shaft on the top of the first top plate and an additional locking nut positioned at the same location as the nut 330. Although some embodiments would not include the spacer 350 and consequently not apply pressure against the shoulder 390 of the flexible portion 160, in further alternate embodiments an additional locking nut could be positioned onto the bolt (or a flange could be integrally formed on the bolt) for performing this function.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. A generator set assembly comprising:
    an alternator;
    an engine coupled to the alternator and capable of transmitting rotational energy to the alternator;
    a base; and
    a plurality of engine mounting components positioned between the base and the engine,
    wherein at least a first of the engine mounting components includes:
        a first rigid portion capable of being fixedly coupled to the engine;
        a second rigid portion capable of being fixedly coupled to the base component;
        a flexible intermediate portion coupled between the first and second rigid portions that allows relative movement of the first and second rigid portions to occur in response to expansion and contraction of the engine during operation of the engine; and
        a further component extending between the first and second rigid portions through the flexible intermediate portion,
    wherein the further component is capable of limiting relative movement of the first and second rigid portions.

2. The generator set assembly of claim 1, wherein at least a second of the mounting components is positioned at a rear end of the engine proximate to the alternator, and wherein the first mounting component is positioned at a front end of the engine.

3. The generator set assembly of claim 2, wherein a third of the mounting components is positioned at the rear end of the engine and a fourth of the mounting components is positioned at the front end of the engine.

4. The generator set assembly of claim 3, wherein the base includes a pair of skid rails, wherein the first and second mounting components are mounted upon the first skid rail, and wherein the third and fourth mounting components are mounted upon the second skid rail.

5. The generator set assembly of claim 4, wherein the base further includes a foundation, and wherein the skid rails are mounted upon the foundation by way of additional mounting components selected from the group consisting of rigid mounting components, rubberized mounting components, elastomeric mounting components, and spring-type mounting components.

6. The generator set assembly of claim 5, wherein at least one of the mounting components provides at least some reduction in an amount of vibrations transmitted from the engine to at least a portion of the base.

7. The generator set assembly of claim 1, wherein the intermediate portion includes a first channel portion, wherein the second rigid portion includes a second channel portion, and wherein the first and second channel portions are at least partly aligned with one another to form an overall channel, and wherein the further component extends through the overall channel.

8. The generator set assembly of claim 7, wherein the further component has an outer diameter that is less than an inner diameter of the overall channel, so that a limited amount of relative shearing movement of the first and second rigid portions can be accommodated by the flexible intermediate portion, the limited amount being determined at least in part by a difference between the inner and outer diameters.

9. The generator set assembly of claim 8, wherein the further component includes a bolt and a sleeve, wherein the outer diameter is that of the sleeve, wherein positioned between the sleeve and the first rigid portion is a shoulder of the intermediate flexible portion that extends inward toward the bolt beyond the inner diameter, and wherein the sleeve assists in maintaining the intermediate flexible portion in position adjacent to the first rigid portion.

10. The generator set assembly of claim 9, wherein the intermediate flexible portion includes a first rigid plate and a second rigid plate that are fixed in position on first and second sides of a rubberized portion in between the rubberized portion and the first and second rigid portions, respectively, and wherein the second rigid plate includes a further channel portion that is part of the first channel portion.

11. The generator set assembly of claim 10, wherein the further component includes a threaded bolt and a threaded nut that is positioned onto the bolt adjacent to the first rigid plate so that the first rigid plate is held against the first rigid portion.

12. The generator set assembly of claim 7, wherein the further component includes a shaft portion that extends out of the overall channel beyond a surface of the second rigid portion and additionally includes a protrusion extending radially outward from a central axis of the shaft portion beyond an outer diameter of the shaft portion and further beyond an inner diameter of the overall channel.

13. The generator set assembly of claim 12, wherein the protrusion is positioned along the shaft portion at a location beyond the surface so that a limited amount of movement of the first and second rigid portions toward and away from one another can be accommodated by the intermediate flexible portion, wherein the first and second rigid portions have moved apart from one another by a maximum amount when the surface of the second rigid portion encounters the protrusion.

14. The generator set assembly of claim 13, wherein the protrusion is a washer positioned onto the shaft portion against a sleeve extending along the shaft portion and into the overall channel, the washer being held against the sleeve by way of an additional nut.

15. The generator set assembly of claim 13, wherein the protrusion is integrally formed with the shaft portion of the further component, wherein the further component extends into a cavity within the second rigid portion.

16. The generator set assembly of claim 13, wherein the second rigid portion is precluded from moving beyond the maximum amount away from the first rigid portion by the protrusion even when the flexible intermediate portion is unable to provide additional resistance to movement beyond the maximum amount.

17. A method of mounting an engine of a generator set to a base so that the engine can expand and contract during operation as a temperature of the engine changes without producing excessive stresses upon mounting components supporting the engine with respect to the base, the method comprising:

providing a mounting component having first and second rigid components attached on opposite sides of a flexible intermediate component, and further having an additional component extending from the one of the first and second rigid components through a channel within the intermediate component and at least a portion of the other of the first and second rigid components, the additional component extending beyond a surface of the other rigid component and having a shaft that extends through the channel and has an outer diameter that is less than an inner diameter of the channel;

fixedly coupling the second rigid component to the base; and fixedly coupling the first rigid component to the engine.

18. The method of claim 17, wherein the additional component includes a protrusion at a location on the shaft that is beyond the surface, wherein the protrusion extends outward from the shaft beyond the inner diameter, and wherein the protrusion limits movement of the rigid components apart from one another.

* * * * *